United States Patent
Kwon et al.

(10) Patent No.: US 8,564,360 B2
(45) Date of Patent: Oct. 22, 2013

(54) PAD CONTROLLING APPARATUS

(75) Inventors: Yong Il Kwon, Gyeonggi-do (KR); Han Jin Cho, Seoul (KR); Tah Joon Park, Gyeonggi-do (KR); Koon Shik Cho, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/440,497

(22) Filed: Apr. 5, 2012

(65) Prior Publication Data

US 2012/0268197 A1 Oct. 25, 2012

(30) Foreign Application Priority Data

Apr. 21, 2011 (KR) .................. 10-2011-0037294

(51) Int. Cl.
*G05F 1/10* (2006.01)
(52) U.S. Cl.
USPC .............................. 327/540; 327/538; 361/56
(58) Field of Classification Search
USPC ......... 327/530, 538, 540, 541, 544, 545, 546, 327/564, 565, 566, 595, 77, 78, 88, 89; 307/33; 361/56, 57, 92, 93.7, 100
See application file for complete search history.

(56) References Cited

U.S. PATENT DOCUMENTS

| | | | | |
|---|---|---|---|---|
| 4,270,084 A * | 5/1981 | Carlon et al. | ................ | 324/694 |
| 4,376,251 A * | 3/1983 | Kobayashi et al. | ........... | 327/165 |
| 5,200,690 A * | 4/1993 | Uchida | ........................ | 320/106 |
| 6,943,592 B2 * | 9/2005 | Degoirat et al. | ............... | 327/77 |
| 2004/0017254 A1 * | 1/2004 | Kao | ............................. | 330/134 |
| 2011/0228429 A1 * | 9/2011 | Ueta et al. | ...................... | 361/31 |

FOREIGN PATENT DOCUMENTS

KR 10-2000-0002924 1/2000

* cited by examiner

*Primary Examiner* — Lincoln Donovan
*Assistant Examiner* — Jung H. Kim

(57) ABSTRACT

Disclosed herein is a pad controlling apparatus controlling current and voltage applied to a pad, the pad controlling apparatus including: a voltage drop unit dropping the voltage applied to the pad; a switching unit connected in parallel with the voltage drop unit; and a control unit comparing a level of the dropped voltage and first reference voltage with each other and turning on the switching unit on when the level of the dropped voltage is larger than the first reference voltage. According to the present invention, even though interrupt occurs from the outside, a chip may be normally operated.

9 Claims, 2 Drawing Sheets

PAD CONTROLLING APPARATUS

CROSS REFERENCE(S) TO RELATED APPLICATIONS

This application claims the benefit under 35 U.S.C. Section 119 of Korean Patent Application Serial No. 10-2011-0037294, entitled "Pad Controlling Apparatus" filed on Apr. 21, 2011, which is hereby incorporated by reference in its entirety into this application.

BACKGROUND OF THE INVENTION

1. Technical Field

The present invention relates to a pad controlling apparatus, and more particularly, to a pad controlling apparatus for controlling a current and a voltage applied to a pad.

2. Description of the Related Art

Recently, research into a technology of using one battery for a long period of time has been actively conducted. In order to use the battery having limited capacity for a long period of time, the capacity of the battery should be increased and power consumption generated from a device itself should be decreased.

A scheme of allowing unnecessary devices to be maintained in a standby state without being operated in order to reduce the power consumption as described above has been suggested.

However, in the scheme suggested as described above, in the case in which the number of elements such as a pad that does not theoretically have power consumption but actually has fine leakage current is plural, the entire leakage current is rapidly increased to act as a main factor of implementing power consumption to be in a standby state.

In order to solve the above-mentioned problem, leakage current generated from the pad is removed by decreasing a magnitude of voltage applied to the pad. However, in the case in which sudden interrupt occurs from the outside, a large amount of current rapidly flows to the pad and voltage applied to the pad is thus decreased significantly, such that a chip having the pad mounted thereon does not normally operate.

Therefore, a scheme of normally driving a chip by controlling voltage applied to a pad so as not to be less than a predetermined level even though interrupt occurs from the outside and a large amount of current thus flows rapidly to the pad has been required.

SUMMARY OF THE INVENTION

An object of the present invention is to provide a pad controlling apparatus capable of normally driving a chip by controlling voltage applied to a pad so as to be a predetermined level or more even though interrupt occurs from the outside and minimizing leakage current in a standby state.

According to an exemplary embodiment of the present invention, there is provided a pad controlling apparatus controlling current and voltage applied to a pad, the pad controlling apparatus including: a voltage drop unit dropping the voltage applied to the pad; a switching unit connected in parallel with the voltage drop unit; and a control unit comparing a level of the dropped voltage and first reference voltage with each other and turning on the switching unit on when the level of the dropped voltage is larger than the first reference voltage.

The control unit may compare the level of the dropped voltage and the first reference voltage with each other and bypass current applied to the voltage drop unit when the level of the dropped voltage is larger than the first reference voltage.

The control unit may compare the level of the dropped voltage and the first reference voltage with each other and allow current flowing to the voltage drop unit to flow to the switching unit when the level of the dropped voltage is larger than the first reference voltage, thereby limiting a voltage drop by the voltage drop unit.

The control unit may detect the level of the dropped voltage by subtracting the voltage dropped and applied to the pad from power supply voltage.

The control unit may detect the level of the dropped voltage by sensing both ends of the voltage drop unit.

The control unit may include a detector detecting the level of the dropped voltage; and a control signal generator outputting a turn-on control signal for turning on the switching unit when the level of the dropped voltage is larger than the first reference voltage and outputting a turn-off control signal for turning off the switching unit when the level of the dropped voltage is smaller than or equal to the first reference voltage.

The voltage drop unit may include a resistor connected in parallel with the switching unit.

The control unit may compare the level of the dropped voltage and the first reference voltage with each other and determine that interrupt has occurred when the level of the dropped voltage is larger than the first reference voltage, and output a turn-on control signal when the interrupt occurs, to bypass current applied to the voltage drop unit.

According to another exemplary embodiment of the present invention, there is provided a pad controlling apparatus controlling current and voltage applied to a pad, the pad controlling apparatus including: a voltage drop unit dropping the voltage applied to the pad; a switching unit connected in parallel with the voltage drop unit; and a control unit turning on the switching unit when the voltage dropped and applied to the pad is smaller than second reference voltage.

The control unit may compare the voltage dropped and applied to the pad and the second reference voltage with each other and bypass the current applied to the voltage drop unit when the voltage dropped and applied to the pad is smaller than the second reference voltage.

The control unit may compare the voltage dropped and applied to the pad and the second reference voltage with each other and determine that interrupt has occurred when the voltage dropped and applied to the pad is smaller than the second reference voltage, and output a turn-on control signal for turning on the switching unit when the interrupt occurs, to bypass the current applied to the voltage drop unit.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Hereinafter, exemplary embodiments of the present invention will be described in detail with reference to the accompanying drawings.

Figure 1:
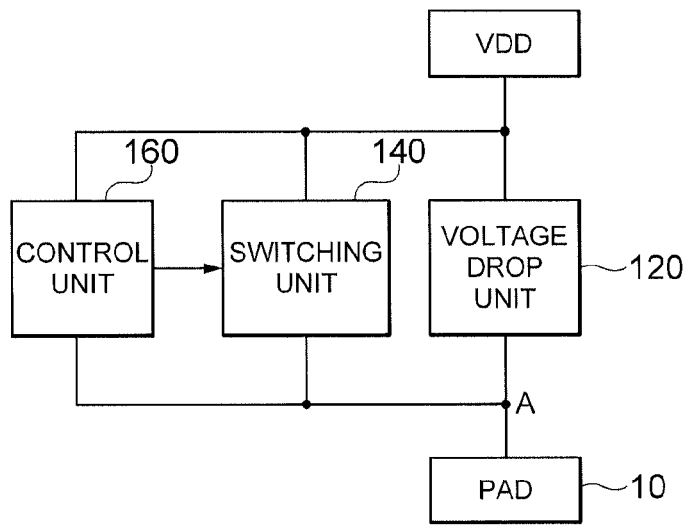
FIG. 1 is a configuration diagram showing a pad controlling apparatus according to an exemplary embodiment of the present invention.
Figure 2:
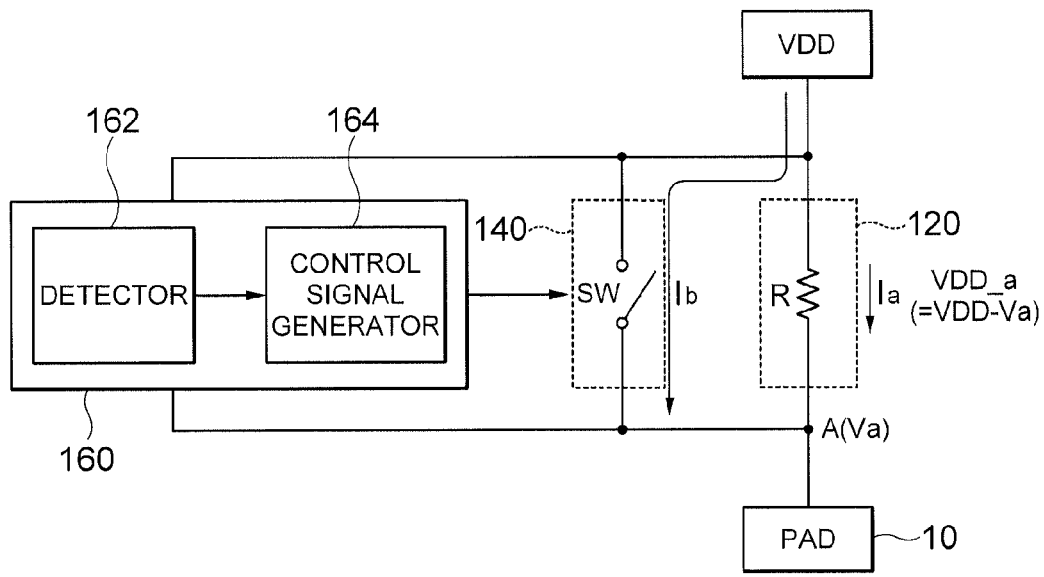
FIG. 2 is a detailed configuration diagram showing the pad controlling apparatus according to the exemplary embodiment of the present invention.

FIG. 1 is a configuration diagram showing a pad controlling apparatus according to an exemplary embodiment of the present invention; and FIG. 2 is a detailed configuration diagram showing the pad controlling apparatus according to the exemplary embodiment of the present invention.

As shown in FIGS. 1 and 2, the pad controlling apparatus 100 includes a voltage drop unit 120, a switching unit 140 and a control unit 160.

Here, it is assumed that the pad controlling apparatus 100 operates in a standby state when interrupt does not occur from the outside.

The voltage drop unit 120, which is a means of dropping voltage applied to a pad 10, is formed of a resistor R.

Here, the voltage drop unit 120 is configured to drop power supply voltage VDD outputted from a power supply according to a value of the resistor R.

The switching unit 140, which is a means connected in parallel with the voltage drop unit 120 and turned on or turned off according to a turn-on/off control signal applied from the control unit 160, is formed of a switching device SW.

In addition, the switching unit 140 is turned on when the turn-on control signal is applied from the control unit 160 thereto, to bypass current Ia flowing to the voltage drop unit 120, thereby allowing current Ib to flow through the switching device SW.

Here, the switching device SW may be implemented by various switches such as a bipolar junction transistor (BJT), an insulated gate bipolar transistor (IGBT), a metal-oxide-semiconductor field effect transistor (MOSFET), and the like.

The control unit 160, which is a means comparing a level of the voltage dropped in the voltage drop unit 120 with first reference voltage (Vref1) and outputting the turn-on/off control signal for turning on or turning off the switching unit 140 according to a result of the comparison, includes a detector 162 and a control signal generator 164.

Here, the detector 162 compares power supply voltage VDD and voltage Va (voltage at a point A) dropped and applied to the pad 10 with each other and detects a level VDD_a of dropped voltage, which is a difference (VDD−Va) between two voltages according to a result of the comparison. That is, the detector 162 detects the level VDD_a of the dropped voltage by subtracting the voltage Va (the voltage at the point A) dropped and applied to the pad 10 from the power supply voltage VDD.

Therefore, when the level VDD_a of the dropped voltage is larger than the first reference voltage (Vref1), the control signal generator 164 outputs the turn-on control signal, and when the level VDD_a of the dropped voltage is smaller than or equal to the first reference voltage (Vref1), it outputs the turn-off control signal.

For example, when the power supply voltage VDD is 5V, the voltage Va (the voltage at the point A) dropped and applied to the pad 10 is 2V, and the first reference voltage is 2V, the level VDD_a of the dropped voltage is 5V−2V=3V, such that the control signal generator 164 outputs the turn-on control signal to deliver the turn-on control signal to the switching unit 140.

In this case, the detector 162 may also detect the level VDD_a of the dropped voltage by sensing both ends of the resistor R, which is the voltage drop unit 120.

Meanwhile, the control unit 160 compares the voltage Va (the voltage at the point A) dropped and applied to the pad 10 and second reference voltage (Vref2) (for example, 1.9V) with each other, and outputs the turn-on control signal to the switching unit 140 in order to bypass current applied to the voltage drop unit 120 when the voltage Va dropped and applied to the pad 10 is smaller than the second reference voltage (Vref2).

In addition, the control unit 160 outputs the turn-off control signal to the switching unit 140 when the voltage Va (the voltage at the point A) dropped and applied to the pad 10 is larger than or equal to the second reference voltage (Vref2).

Meanwhile, when interrupt occurs from the outside while the pad controlling apparatus operates in a standby state, a large amount of current Ia rapidly flows to the pad 10 and the voltage Va (the voltage at the point A) applied to the pad 10 is significantly decreased due to a voltage drop by the voltage drop unit 120, such that a chip may not normally operate.

Therefore, the control unit 160 detects the level VDD_a of the dropped voltage using a comparison result between the power supply voltage VDD and the voltage (the voltage at the point A) dropped and applied to the pad 10 Va, and determines that the interrupt has occurred when the level VDD_a of the dropped voltage is larger than the first reference voltage (Vref1).

In addition, the control unit 160 may also compare the voltage (the voltage at the point A) dropped and applied to the pad 10 Va and the second reference voltage (Vref2) with each other and determine that the interrupt has occurred when the voltage Va dropped and applied to the pad 10 is smaller than the second reference voltage (Vref2).

In addition, the control unit 160 outputs the turn-on control signal when the interrupt occurs, to bypass the current Ia flowing to the voltage drop unit 120 and thus allow the current Ia to flow to the switching unit 140, thereby preventing the voltage Va (the voltage at the point A) dropped and applied to the pad 10 from being significantly decreased. That is, the control unit 160 performs a control so that the voltage is not dropped at the point A when the interrupt occurs, to secure the voltage applied to the pad 10

Therefore, even though the interrupt suddenly occurs from the outside, the chip may normally operate.

Figure 3:
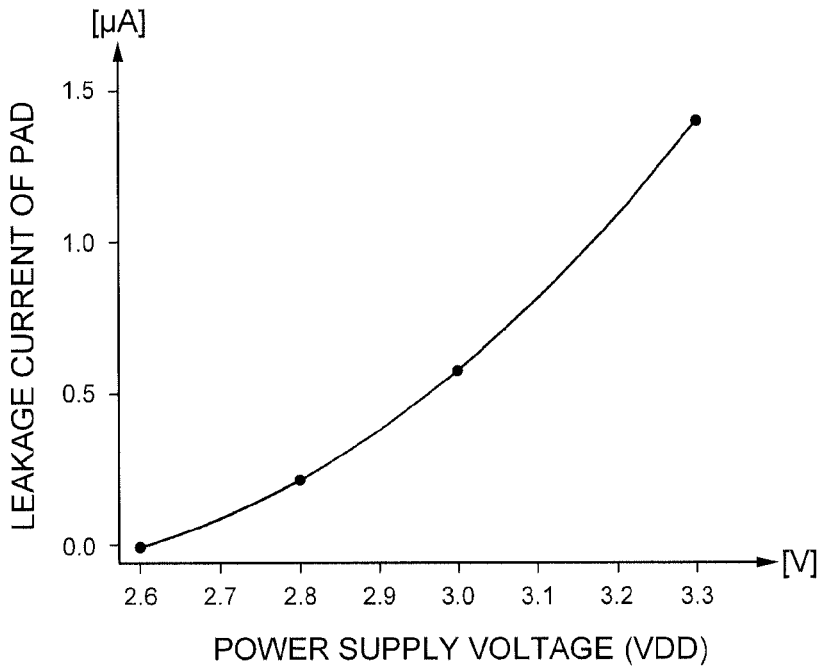
FIG. 3 is a graph showing leakage current of a pad according to applied voltage.

FIG. 3 is a graph showing leakage current of a pad according to applied voltage.

Referring to FIG. 3, it may be appreciated that as a magnitude of applied power supply voltage VDD is increased, leakage current of a pad is increased and that when the power supply voltage VDD is decreased below 2.6V, the leakage current of the pad is removed.

Through the above-mentioned principle, the voltage Va applied to the pad 10 is decreased below 2.6 V due to the voltage drop by the voltage drop unit 120 in the standby state in which the interrupt does not occur, thereby reducing the leakage current of the pad.

Figure 4:
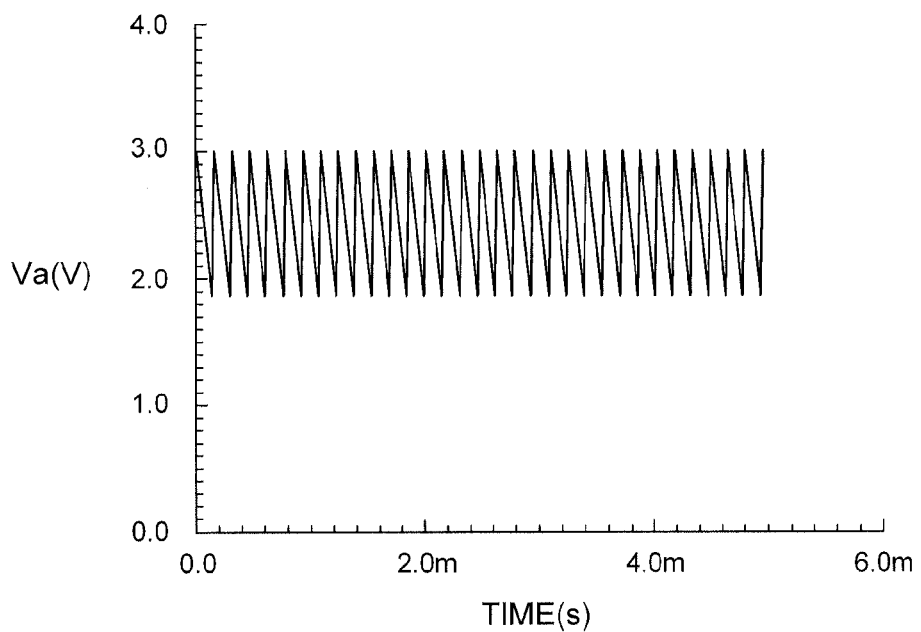
FIG. 4 is a graph showing a result of the pad controlling apparatus according to the exemplary embodiment of the present invention.

FIG. 4 is a graph showing a result of the pad controlling apparatus according to the exemplary embodiment of the present invention.

Referring to FIG. 4, the control unit 160 bypasses the current Ia flowing to the voltage drop unit 120 when the interrupt occurs, to allow the current Ib to flow to the switching unit 140, thereby making it possible to remove the leakage current of the pad 10 while performing a control so that the voltage Va dropped and applied to the pad 10 is not decreased below 1.8V.

As set forth above, the pad controlling apparatus according to the exemplary embodiments of the present invention performs a control so that the voltage applied to the pad is a predetermined level or more even though the interrupt occurs from the outside, thereby making it possible to normally operate the chip and minimize the leakage current in the standby state.

That is, when the interrupt occurs from the outside, the current flowing from the voltage drop unit to the pad is bypassed to prevent the drop of the voltage applied to the pad, thereby making it possible to normally operate the chip, and when the interrupt does not occur from the outside, the current flows from the voltage drop unit to the pad, thereby making it possible to minimize the leakage current generated in the standby state.

Although the present invention has been shown and described with the exemplary embodiment as described above, the present invention is not limited to the exemplary embodiment as described above, but may be variously changed and modified by those skilled in the art to which the present invention pertains without departing from the scope of the present invention.

What is claimed is:

1. A pad controlling apparatus controlling current or voltage applied to a pad, the pad controlling apparatus comprising:
    a voltage drop unit dropping a voltage applied from a power supply to the pad;
    a switching unit connected in parallel with the voltage drop unit; and
    a control unit comparing a dropped voltage between the power supply and the pad with a reference voltage and turning on the switching unit when the dropped voltage is larger than the reference voltage, thereby bypassing a current of the voltage drop unit through the switching unit.

2. The pad controlling apparatus according to claim 1, wherein the control unit controls an amount of the dropped voltage being dropped by the voltage drop unit.

3. The pad controlling apparatus according to claim 1, wherein the control unit detects the dropped voltage by subtracting an applied-to-pad voltage from a power supply voltage.

4. The pad controlling apparatus according to claim 1, wherein the control unit detects the dropped voltage by sensing both ends of the voltage drop unit.

5. The pad controlling apparatus according to claim 1, wherein the control unit includes:
    a detector detecting the dropped voltage; and
    a control signal generator outputting a turn-on control signal for turning on the switching unit when the dropped voltage is larger than the reference voltage and outputting a turn-off control signal for turning off the switching unit when the dropped voltage is smaller than or equal to the first reference voltage.

6. The pad controlling apparatus according to claim 1, wherein the voltage drop unit includes a resistor connected in parallel with the switching unit.

7. The pad controlling apparatus according to claim 1, wherein the control unit determines that interrupt has occurred when the dropped voltage is larger than the reference voltage.

8. A pad controlling apparatus controlling current or voltage applied to a pad, the pad controlling apparatus comprising:
    a voltage drop unit dropping a voltage applied from a power supply to the pad;
    a switching unit connected in parallel with the voltage drop unit; and
    a control unit comparing a dropped voltage between the power supply and the pad with a reference voltage and turning on the switching unit when the dropped voltage is larger than the reference voltage, thereby limiting an amount of the dropped voltage being dropped by the voltage drop unit.

9. A pad controlling apparatus controlling current or voltage applied to a pad, the pad controlling apparatus comprising:
    a voltage drop unit dropping a voltage applied from a power supply to the pad;
    a switching unit connected in parallel with the voltage drop unit; and
    a control unit comparing a dropped voltage between the power supply and the pad with a reference voltage, determining that interrupt has occurred when the dropped voltage is larger than the reference voltage, and turning on the switching unit by outputting a turn-on control signal when the interrupt occurs, thereby bypassing a current of the voltage drop unit applied to the voltage drop unit.

* * * * *